United States Patent
Wilhelmsson et al.

(10) Patent No.: US 11,240,090 B2
(45) Date of Patent: Feb. 1, 2022

(54) RECEIVER, COMMUNICATION APPARATUS, METHOD AND COMPUTER PROGRAM

(71) Applicant: Telefonaktiebolaget LM Ericsson (publ), Stockholm (SE)

(72) Inventors: Leif Wilhelmsson, Lund (SE); Miguel Lopez, Solna (SE); Dennis Sundman, Sollentuna (SE)

(*) Notice: Subject to any disclaimer, the term of this patent is extended or adjusted under 35 U.S.C. 154(b) by 0 days.

(21) Appl. No.: 16/759,592

(22) PCT Filed: Sep. 26, 2018

(86) PCT No.: PCT/EP2018/076104
§ 371 (c)(1),
(2) Date: Apr. 27, 2020

(87) PCT Pub. No.: WO2019/086178
PCT Pub. Date: May 9, 2019

(65) Prior Publication Data
US 2020/0280479 A1 Sep. 3, 2020

Related U.S. Application Data

(60) Provisional application No. 62/581,297, filed on Nov. 3, 2017.

(51) Int. Cl.
*H04L 27/38* (2006.01)
*H04L 27/06* (2006.01)

(52) U.S. Cl.
CPC .......... *H04L 27/3809* (2013.01); *H04L 27/06* (2013.01); *H04L 27/3881* (2013.01)

(58) Field of Classification Search
CPC .. H04L 27/06; H04L 27/3809; H04L 27/3881
See application file for complete search history.

(56) References Cited

U.S. PATENT DOCUMENTS

| | | | |
|---|---|---|---|
| 5,500,651 A | 3/1996 | Schuermann | |
| 5,852,630 A | 12/1998 | Langberg et al. | |

(Continued)

FOREIGN PATENT DOCUMENTS

| | | |
|---|---|---|
| EP | 0977408 A2 | 2/2000 |
| EP | 1209841 A2 | 5/2002 |

(Continued)

OTHER PUBLICATIONS

International Search Report and Written Opinion dated Nov. 29, 2018 for International Application No. PCT/EP2018/076087 filed on Sep. 26, 2018, consisting of 9-pages.

(Continued)

*Primary Examiner* — David B Lugo

(57) ABSTRACT

A receiver receives binary information from a transmission using a binary amplitude shift keying where information symbols are represented by a signal including a first power state and a second power state. A duration of a bit includes a first part where the second power state is applied irrespective of which binary value is represented, and a second part where a binary value is represented by any of the first power and a third power state or a combination pattern of the first power state and the third power state. A sampling circuit is arranged to retrieve samples of the received signal during the second part and discard samples during the first part. A duration of the retrieving of samples is selected to be a time corresponding to the duration of the second part plus a time based on an expected synchronization error.

18 Claims, 4 Drawing Sheets

(56) References Cited

U.S. PATENT DOCUMENTS

| | | | |
|---|---|---|---|
| 5,920,278 A * | 7/1999 | Tyler | G01S 5/14 342/140 |
| 6,176,432 B1 | 1/2001 | Miyaura | |
| 6,792,050 B1 | 9/2004 | Shiikuma et al. | |
| 9,787,355 B2 | 10/2017 | Tian et al. | |
| 2001/0017895 A1 | 8/2001 | Ohtani et al. | |
| 2007/0041476 A1 | 2/2007 | Seon | |
| 2008/0267324 A1 | 10/2008 | Mimura et al. | |
| 2010/0208849 A1 | 8/2010 | Grosskinsky | |
| 2011/0243267 A1 | 10/2011 | Won et al. | |
| 2012/0219092 A1 | 8/2012 | Ishihara et al. | |
| 2013/0343248 A1 | 12/2013 | Toner et al. | |
| 2014/0086292 A1 | 3/2014 | Akhavan et al. | |
| 2014/0119410 A1 | 5/2014 | Tian et al. | |
| 2016/0278013 A1 | 9/2016 | Shellhammer et al. | |
| 2019/0260624 A1 * | 8/2019 | Park | H04L 27/02 |
| 2020/0045635 A1 | 2/2020 | Lin et al. | |
| 2020/0127756 A1 * | 4/2020 | Iwai | H04J 13/22 |
| 2020/0280479 A1 | 9/2020 | Wilhelmsson et al. | |

FOREIGN PATENT DOCUMENTS

| | | | |
|---|---|---|---|
| EP | 1607764 A1 | 12/2005 | |
| EP | 2492841 A2 | 8/2012 | |
| EP | 2663110 A1 | 11/2013 | |
| JP | 19913153794 A | 3/1991 | |
| JP | 200049874 A | 2/2000 | |
| JP | 2001172571 A | 6/2001 | |
| JP | 2005512443 A | 4/2005 | |
| JP | 2006108833 A | 4/2006 | |
| JP | 2009192447 A | 8/2009 | |
| JP | 5590431 B1 | 9/2014 | |
| JP | 2016509437 A | 3/2016 | |
| WO | 2009044365 A2 | 4/2009 | |

OTHER PUBLICATIONS

Junghoon Suh, et. al.; "Blank GI choices under Timing Errors"; IEEE 802.11-17/1390r1; Sep. 12, 2017 consisting of 28-pages.

Eunsung Park; "Symbol Structure"; IEEE 802.11-17/1347r3; Sep. 11, 2017; consisting of 23-pages.

ETSI EN 300 328 V2.1.1; Wideband transmission systems; Data transmission equipment operating in the 2,4 GHz ISM band and using wide band modulation techniques; Harmonised Standard covering the essential requirements of article 3.2 of Directive 2014/53/EU; Nov. 2016, consisting of 101-pages.

Sahin et al.; OOK Waveform Coding Scheme for Frequency Domain Multiplexing; IEEE802.11-17/1419r0; Sep. 11, 2017, consisting of 15-pages.

Park et al.; "Low-Power Wake-Up Receiver (LP-WUR) for 802.11" IEEE802.11-15/1307r1; Nov. 10, 2015, consisting of 18-pages.

Wilhelmsson et al.; "Partial OOK—Generalizing the Blank GI Idea" IEEE802.11-17/1673r1; Nov. 6, 2017, consisting of 25-pages.

Del Prete et al. Experimental Analysis of Power Optimized Waveforms for Enhancing Wake-up Radio Sensitivity; IEEE 978-1-5090-0698-4/16; 2016, consisting of 4-pages.

International Search Report and Written Opinion dated Nov. 29, 2018 for International Application No. PCT/EP2018/076104 filed on Sep. 26, 2018, consisting of 14-pages.

International Search Report and Written Opinion dated Nov. 29, 2018 for International Application No. PCT/EP2018/076067 filed on Sep. 26, 2018, consisting of 13-pages.

Non Final Office Action dated Sep. 30, 2020, issued in U.S. Appl. No. 16/759,510, consisting of 21 pages.

Japanese Office Action with English Translation dated Jul. 27, 2021 for Patent Application No. 2020521455, consisting of 12-pages.

Office Action dated Jul. 22, 2021 for U.S. Appl. No. 16/755,501, filed Apr. 10, 2020, consisting of 17-pages.

* cited by examiner

RECEIVER, COMMUNICATION APPARATUS, METHOD AND COMPUTER PROGRAM

CROSS-REFERENCE TO RELATED APPLICATIONS

This application is a Submission Under 35 U.S.C. § 371 for U.S. National Stage Patent Application of International Application No.: PCT/EP2018/076104, filed Sep. 26, 2018 entitled "RECEIVER, COMMUNICATION APPARATUS, METHOD AND COMPUTER PROGRAM FOR RECEIVING BINARY INFORMATION," which claims priority to U.S. Provisional Application No. 62/581,297, filed Nov. 3, 2017, entitled "RECEIVER, COMMUNICATION APPARATUS, METHOD AND COMPUTER PROGRAM," the entireties of both of which are incorporated herein by reference.

TECHNICAL FIELD

The present disclosure generally relates to a receiver, a communication apparatus, methods therefor, and computer programs for implementing the method. In particular, the disclosure relates to receiving a wireless signal carrying binary information in a way less prone to synchronisation errors.

BACKGROUND

The telecommunications domain has often so forth been accompanied by a significant increase of electrical energy consumption. Demands on performance, such as spectral efficiency or data rate, have been met at the expense of more energy consumption. Advances in analogue and digital electronics have enabled development of low-cost, low-energy wireless nodes. However, energy consumption remains an issue for some applications. The approach used for idle mode listening, especially when used by devices related to the field commonly referred to as Internet of Things, IoT, in wireless networks impacts the overall energy consumption for the devices. This is particularly noticeable when the data traffic is very sporadic.

Energy reduction may for example be performed by an approach in which it is possible to switch off a radio frequency main interface during inactive periods and to switch it on only if a communication demand occurs. For example, by using a wake-up radio, where a wake-up signal is sent by using a transmitter, received and decoded at the device, wherein the main radio is activated, significant energy consumption reduction may be achieved for many applications.

Furthermore, efforts to reduce energy consumption may be made at different levels of the communication stack, such as the medium access control (MAC) protocol, by dynamically adapting the sleep and wake times of main radio protocols. Limited complexity signals and thus limited complexity decoders for the intermittently presented control signals may improve energy efficiency.

These efforts affect the physical layer (PHY), where control mechanisms for activation or deactivation of more energy consuming operations reside, which put demands on lean control signalling.

An example in the PHY is application of an On-Off Keying, OOK, signal as illustrated in FIG. 1, which is a modulation scheme where the presence of a signal represents the ON part or state and the absence of the signal represents the OFF part or state. For example, the ON and OFF parts could represent binary digits, or the transition between ON to OFF state and OFF to ON state could represent binary digits. OOK is considered the simplest form of amplitude-shift keying, ASK, that represents digital data at the presence or absence of a signal. In its simplest form, the presence of a carrier for a specific duration represents a binary one, while its absence for the same duration represents a binary zero. Some more sophisticated schemes vary these durations to convey additional information. OOK is analogous to unipolar encoding, which is a special case of a line code. OOK is a suitable modulation to use whenever the power consumption of the receiver is a major concern, as the demodulation can be done non-coherently, with very relaxed requirements on gain control and resolution in the receiver.

In order to decode OOK, the receiver has to estimate which signal level corresponds to the presence of a signal and which signal level corresponds to the absence of a signal. Manchester Coding is a modulation means used to simplify clock recovery and to simplify demodulation by ensuring that the average signal level of the signal carries no information. FIG. 2 illustrates a data bit with value one is represented by, i.e. encoded to, a logical one followed by a logical zero, whereas a data bit with value zero is represented by a logical zero followed by a logical one. Alternatively, the encoding can be swapped so that a data bit with value one is represented by a logical zero followed by a logical one, etc.

Clock recovery is simplified because there will always be a transition from zero to one or vice versa in the middle of each symbol irrespectively of what the data is.

The decoding of the Manchester coded symbol is essentially done by comparing the first and the second half of the symbols and deciding in favour of a logical one if the first half of the symbol has larger energy than the second half of the same symbol, or vice versa. Instead of energy, one can also use other means of measuring the signal level, for example absolute signal-envelope averaged over the symbol duration.

For example, Manchester coded OOK is being standardized within the IEEE 802.11ba task group (TG). TG 802.11ba develops a standard for wake-up radios (WUR), targeting to significantly reduce the power consumption in devices based on the 802.11 standard. It is proposed to generate the wake-up signal (WUS) by using an inverse fast Fourier transform (IFFT), as this block is already available in Wi-Fi transmitters supporting e.g. 802.11a/g/n/ac. Specifically, an approach discussed for generating the OOK is to use the 13 sub-carriers in the centre, possibly excluding the DC carrier, and then populating these with some signal to represent ON and to not transmit anything at all to represent OFF.

As an alternative to OOK and textbook Manchester coded OOK, as shown in FIGS. 1 and 2, it is feasible to zero-pad a portion of the ON part of the signal to further improve the performance. FIGS. 3 to 5 illustrate such approaches, where $T_Z$ and $T_{NZ}$ denote the time when the ON signal, i.e. where the signal is ON in the examples given in FIGS. 1 and 2, is zero and non-zero, respectively. FIG. 3 illustrates to the left a traditional Manchester OOK and to the right an adapted keying with zero-padded parts $T_Z$. The potential improvement comes from that the same energy is received during a shorter time $T_{NZ}$. Since the noise energy is proportional to that time, the signal-to-noise ratio, SNR, may be increased correspondingly upon properly arranged reception of the signal. Thus, FIG. 4 illustrates a signal with modified OOK by zero-padding of a portion $T_Z$ of the symbol time $T_b$, and FIG. 5 illustrates a signal with modified Manchester OOK by zero-padding a portion $T_Z$ of the signal part that traditionally would have been ON.

Hypothetically, the SNR can in this way be made infinite. This is impossible in practice though. There are technical and regulatory aspects that may prevent the SNR from becoming arbitrarily large.

With a signal having extensive zero-padding and a desire to obtain SNR gain as indicated above, there is a desire to provide a suitable receiver approach.

SUMMARY

The disclosure is based on the inventors' understanding that sampling of a zero-padded signal to obtain SNR gain connected therewith should be done wisely, and in particular wisely in view of expected synchronisation errors.

According to a first aspect, there is provided a receiver arranged to receive binary information from a transmission using a binary amplitude shift keying where information symbols are represented by a signal including a first power state and a second power state. The first power state having a higher signal power than the second power state. A duration of a bit includes a first part where the second power state is applied irrespective of which binary value being represented, and a second part where a binary value is represented by any of the first power and a third power state or a combination pattern of the first power state and the third power state. The first power state has a higher signal power than the third power state. The receiver comprises a sampling circuit arranged to retrieve samples of the received signal during the second part and discard samples during the first part. A duration of the retrieving of samples is selected such that it is a time corresponding to the duration of the second part plus a time based on an expected synchronization error.

The duration of the second part may be variable to comprise $½^n$ of the duration of the bit, where n is any of 1, 2 or 3, wherein the sampling circuit may be arranged to have higher sampling rate for shorter duration of the second part, and vice versa. The duration of the second part may be derived from an allocated bit rate for the received transmission.

The sum of the duration of the first part and the second part is usually equal to the duration the bit.

The receiver may be arranged to have an indication on channel conditions, wherein the duration of the sampling may be made shorter for worse channel conditions, and vice versa. The indication on channel conditions may be derived by the receiver from a previous transmission.

The duration of the second part may be variable, and a ratio between the duration of the second part and the duration of the sampling may be decreased when the duration of the second part is decreased, and vice versa.

The expected synchronization error may be predetermined, or the expected synchronization error may be estimated based on elapsed time since a previous transmission where synchronization could be established.

According to a second aspect, there is provided a method performed by a receiver arranged to receive binary information from a transmission using a binary amplitude shift keying where information symbols are represented by a signal including a first power state and a second power state. The first power state has a higher signal power than the second power state. A duration of a bit includes a first part where the second power state is applied irrespective of which binary value being represented, and a second part where a binary value is represented by any of the first power and a third power state or a combination pattern of the first power state and the third power state. The first power state has a higher signal power than the third power state. The method comprises retrieving samples of the received signal during the second part, and discarding samples during the first part. The method comprises selecting a duration of the retrieving of samples such that it is a time corresponding to the duration of the second part plus a time based on an expected synchronization error.

The duration of the second part may be variable to comprise $½^n$ of the duration of the bit, where n is any of 1, 2 or 3. The method may comprise selecting a higher sampling rate for shorter duration of the second part, and vice versa. The method may comprise deriving the duration of the second part from an allocated bit rate for the received transmission.

The method may comprise acquiring an indication on channel conditions, and selecting the duration of the sampling to be shorter for worse channel conditions, and vice versa. The acquiring of the indication on channel conditions may comprise estimating channel conditions of a previous transmission.

The duration of the second part may be variable, and the method may comprise decreasing a ratio between the duration of the second part and the duration of the sampling when the duration of the second part is decreased, and vice versa.

The expected synchronization error may be predetermined, or the method may comprise estimating the expected synchronization error based on elapsed time since a previous transmission where synchronization could be established.

According to a third aspect, there is provided a computer program comprising instructions which, when executed on a processor of a receiver, causes the receiver to perform the method according to the second aspect.

According to a fourth aspect, there is provided a communication apparatus comprising a receiver according to the first aspect.

The receiver may be arranged to operate as a wake-up receiver arranged to control on and off states of a main transceiver of the communication apparatus based on the signal received by the receiver.

BRIEF DESCRIPTION OF THE DRAWINGS

The above, as well as additional objects, features and advantages of the present disclosure, will be better understood through the following illustrative and non-limiting detailed description of preferred embodiments of the present disclosure, with reference to the appended drawings.

FIG. 5 illustrates a signal with modified Manchester OOK by zero-padding a portion $T_Z$ of the signal part that traditionally would have been ON.

DETAILED DESCRIPTION

Figure 6:
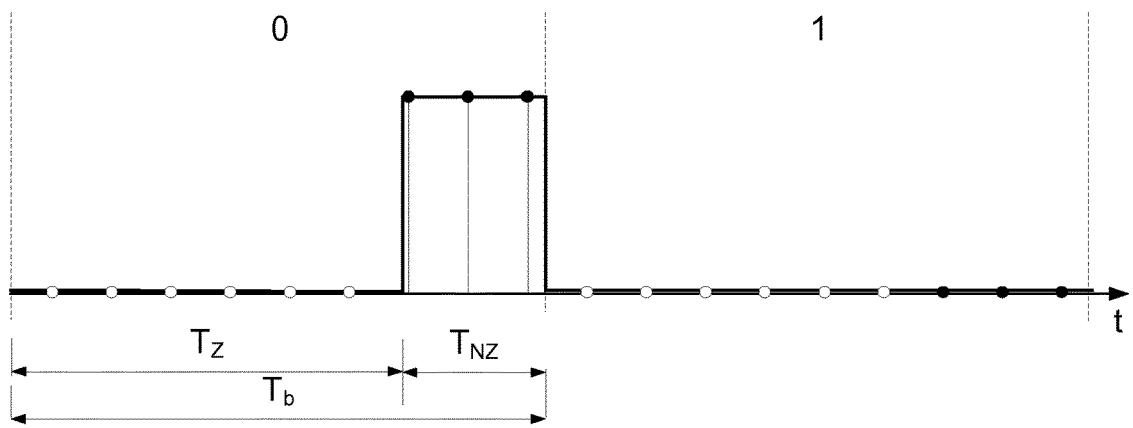
FIG. 6 is a signal diagram of a received zero-padded signal where sampling occasions are schematically illustrated.

FIG. 6 is a signal diagram of a received zero-padded signal where sampling occasions are schematically illustrated. Here, a zero timing error is assumed. It is also assumed that the receiver is aware of the degree of zero-padding, and the receiver can thus easily only retrieve those samples (filled circles) that corresponds to the non-zero-padded part of the signal which results in that any samples of noise in the zero-padded part is not retrieved (empty circles). The SNR gain is thus fully achieved.

Figure 7:
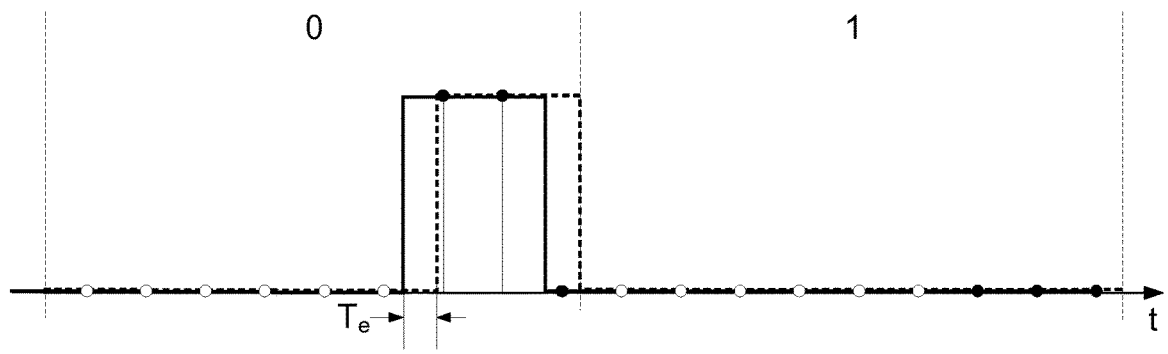
FIG. 7 is a signal diagram which illustrates an example of a synchronisation error.

FIG. 7 is a signal diagram which illustrates an example of a synchronisation error. The diagram of FIG. 7 illustrates the actual received signal (solid line), i.e. with synchronisation error and a corresponding signal (dashed line) for no synchronisation error. The dashed line may also be seen as the placement of the receiver window. The synchronisation error can thus be represented with the timing difference $T_e$. Here, it can be seen that with a same sampling retrieving as for FIG. 6, one of the samples will not contain the first power state signal and instead mainly consist of noise since the second power state is zero or close to zero power. If the ideal high-power part, as indicated by the dashed line, is considered a receiving window, i.e. irrespective of how retrieved samples happen to be in relation to the signal, a loss caused by the synchronisation error can be seen as $$SNR_{loss} = \frac{T_{NZ}}{T_{NZ} - T_e}$$

where $0 \le T_e < T_{NZ}$. Combining this with the ideal SNR power gain that is obtainable from using the zero-padded OOK, the overall gain including a synchronisation error is $$SNR_{gain} = \frac{T_b}{T_{NZ}} \frac{T_{NZ} - T_e}{T_{NZ}}$$

where $0 \le T_e \le T_{NZ}$. Consider a numerical example where $T_b = 8$ μs, $T_{NZ} = 2$ μs, and $T_e = 0.5$ μs. In such case, the gain is $$SNR_{gain} = \frac{8}{2} \frac{2 - 0.5}{2} = 3$$

That is, the ideal gain of a factor of 4, i.e. 6 dB, is reduced to a factor of 3, i.e. 4.8 dB, losing 1.2 dB. For the case the synchronisation error is larger, e.g. 1.5 μs, the gain is $$SNR_{gain} = \frac{8}{2} \frac{2 - 1.5}{2} = 1$$

i.e. resulting in no gain at all. From this, when the duration of the high power part decreases, the gain quickly decreases upon increasing synchronisation error, and if the synchronisation error is larger than the time of high power, the sampling will miss the present signal and no decoding is possible. It is therefore suggested a more robust approach, as will be demonstrated below.

Figure 8:
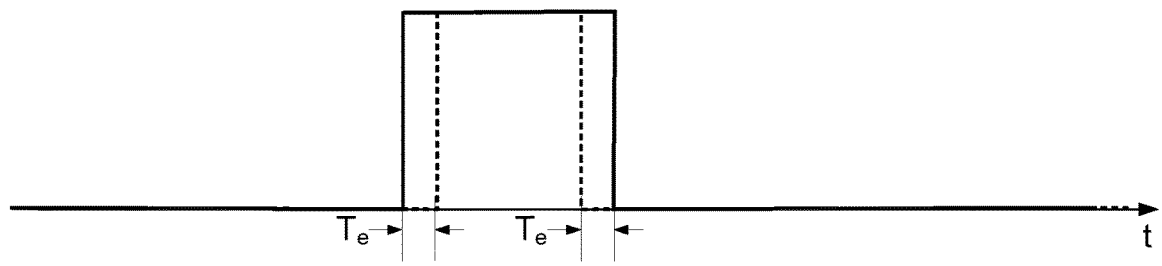
FIG. 8 is a signal diagram which illustrates a signal for no synchronisation error and a receiver window.

FIG. 8 is a signal diagram which illustrates a signal (dashed line) for no synchronisation error and a receiver window (solid line) which is based on the time of the signal to be observed for achieving the gain, e.g. $T_{NZ}$ for the zero-padded OOK discussed above, and on an expected synchronisation error $T_e$. The receiver window is thus widened to make sure that the received signal is captured. That is, assuming that the synchronisation error is not larger than the expected synchronisation error, the entire desired signal will fall within the receiver window. On the other hand, the widening of the receiver window will collect more noise, and will to some extent degrade the benefits of the zero-padded approach. The gain will thus be reduced from $$SNR_{gain} = \frac{T_b}{T_{NZ}}$$

to $$SNR_{gain} = \frac{T_b}{T_{NZ} + 2T_e}$$

where the receiver window is arranged to handle a synchronisation error of +/− $T_e$.

Taking the first numerical example used above, i.e. $T_b = 8$ μs, $T_{NZ} = 2$ μs, and $T_e = 0.5$ μs, the gain will be $$SNR_{gain} = \frac{8}{2 + 2 \cdot 0.5} = \frac{8}{3}$$

i.e. 4.3 dB and thus a loss of 1.7 in view of ideal gain and 0.5 in view of the example demonstrated with reference to FIG. 7. However, for the second numerical example used above, i.e. $T_b = 8$ μs, $T_{NZ} = 2$ μs, and $T_e = 1.5$ μs, the gain will be $$SNR_{gain} = \frac{8}{2 + 2 \cdot 1.5} = \frac{8}{5}$$

i.e. 2 dB and thus still a gain where the example above gave no gain at all. Robustness is thus achieved at the expense of lower gain for small synchronisation errors. From the analysis above, it can also be seen that by choosing the window widening wisely, i.e. by having a good estimate of expected synchronisation error, gain may be achieved for most situations.

In a practical implementation of a receiver, the received signal may be sampled and quantized in an analog-to-digital converter, ADC. To keep energy consumption low, it is desirable to operate the ADC at as low sampling frequency as possible and with as few bits of resolution as possible. As indicated above, this may have impact on the effects of the synchronisation error.

Figure 9:
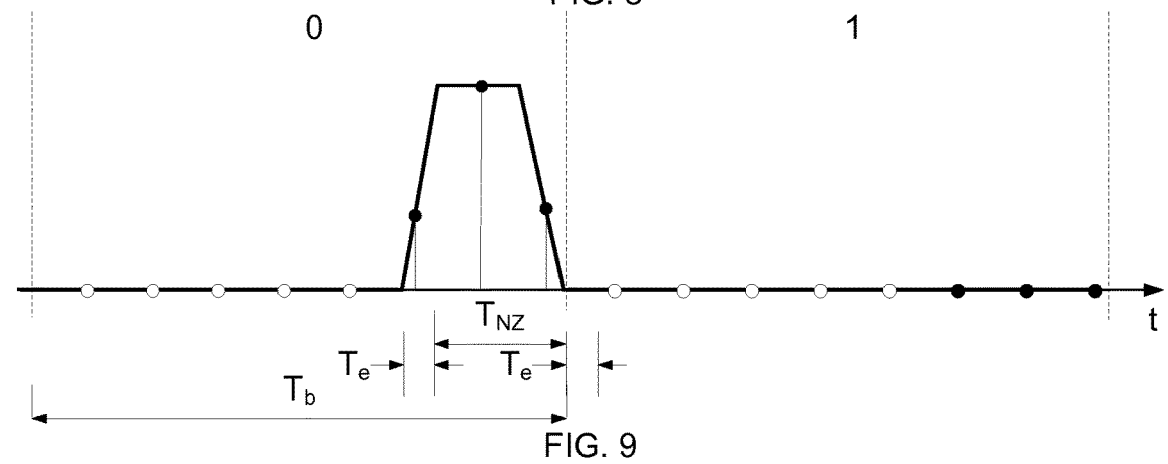
FIG. 9 illustrates an example where a receiver window is applied, and where a received signal has a slight synchronisation error and finite rise and fall times wherein the timing happens to be such that two out of the three samples provides inappropriate values.

Considering again the example where $T_b=8$ µs, $T_{NZ}=2$ µs, and $T_e=0.5$ µs, and suppose that the ADC uses a sampling rate of 1 MHz so that each bit time $T_b$ is sampled 8 times, i.e. every 1 µs. Thus, two samples of each ON period should be obtained, but due to natural existing deviations and imperfections, the ON period may be registered properly by only one sample. One example is illustrated in FIG. 9 where a receiver window of width $T_{NZ}+2 \cdot T_e$ is applied, and where signal has a slight synchronisation error, which is handled by the receiver window, and finite rise and fall times wherein the timing happens to be such that two out of the three samples provides inappropriate values. Many other examples may be considered where different effects play a role. This may reduce performance, and it is particularly present when the high-power part is very short. One way to alleviate this is to use an increased sampling rate, e.g. such that at least a predetermined number of samples are taken during the time $T_{NZ}$ for the high-power part, e.g. at least four samples.

Thus, a duration of the retrieving of samples, i.e. the receiver window, is selected such that it is a time corresponding to the duration of the second part $T_{NZ}$ plus a time based on an expected synchronisation error $T_e$. For example, the receiver window may be selected to be based on the synchronisation error such that is becomes $T_{NZ}+2 \cdot T_e$, i.e. symmetric widening of the receiver window, or be based on the synchronization error such that it becomes $T_{NZ}+T_e$ with asymmetric widening. The expected synchronisation error may for example be based on a previous transmission and/or on when a last successful synchronisation was made, i.e. the longer time that has elapsed from a successful synchronisation, the larger expected synchronisation error. The synchronisation error may also be based on a type of clock signal that has been used lately in the receiver, i.e. if an accurate (and reasonably energy consuming) clock has been used, the expected synchronisation error is chosen to be smaller than if a less accurate (and less energy consuming) clock has been used. Other aspects, such as channel conditions may also be part of the consideration when assigning the receiver window. For example, if it is determined that noise level is very low, the receiver window may be widened without much loss. On the other hand, if it is determined that harsh conditions, including reflection paths of the signal, the synchronisation error may be expected to be large, i.e. a delayed reflection may be the strongest signal. Thus, the expected synchronisation error may be derived by more or less complex considerations, and the assignment of the receiver window based on the expected synchronisation error may be made on more or less complex information and assumptions about how the synchronisation error will affect the reception of the transmission. Considering a least complex approach, the expected synchronisation error $T_e$ is predetermined, e.g. from knowledge at design of the communication system, and the assignment of the receiver window is fixed to $T_{NZ}+2 \cdot T_e$ with symmetric widening of the receiver window.

Figure 10:
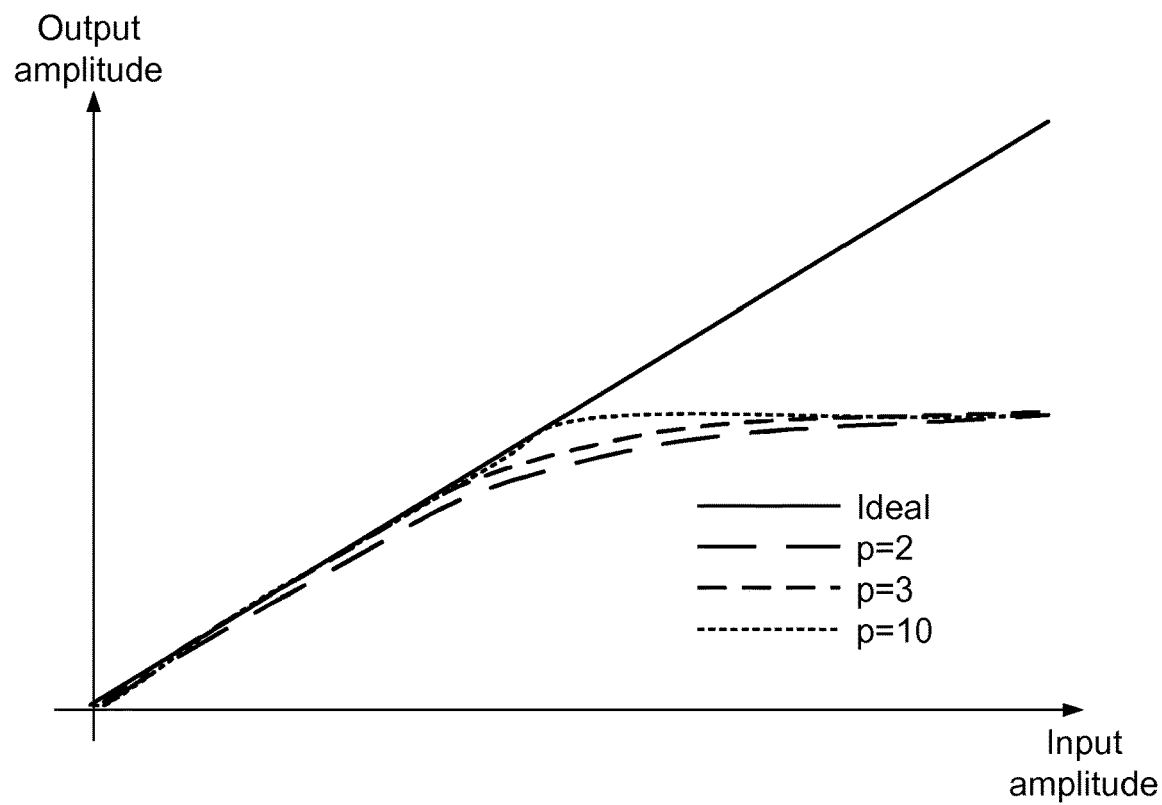
FIG. 10 illustrates an example of an input-output characteristic of a power amplifier.

For the understanding of nature of the zero-padded signal, examples of how a transmitter is providing such zero-padded signal will be briefly given here. In practice, there is a limit on the maximum peak power that can be used for the transmissions. One limitation may be set by a power amplifier used by the transmitter. For this limitation, it needs to be considered how much power back-off is typically needed in order to ensure that the power amplifier is operating in a sufficiently linear range. FIG. 10 illustrates an example of an input-output characteristic of a power amplifier. In short, if the modulation uses a large peak-to-average ratio (PAR) a higher back-off is normally required than if a smaller peak-to-average ratio is used. Another limitation may be from radio transmission regulations or the used transmission system or radio access technology, i.e. regulatory limitations.

As an example, in IEEE 802.11, when evaluation of performance is made, it can be assumed that average transmission power is limited to 17 dBm and saturation power for the power amplifier can typically be 25 dBm. This means that the back-off is 8 dB. Here the back-off is related to the saturation power, but alternatively the back-off is related to 1 dB compression point, which is the point where the output power of the power amplifier is 1 dB less than would have been the ideal case with a linear input-output relationship.

Figure 1:
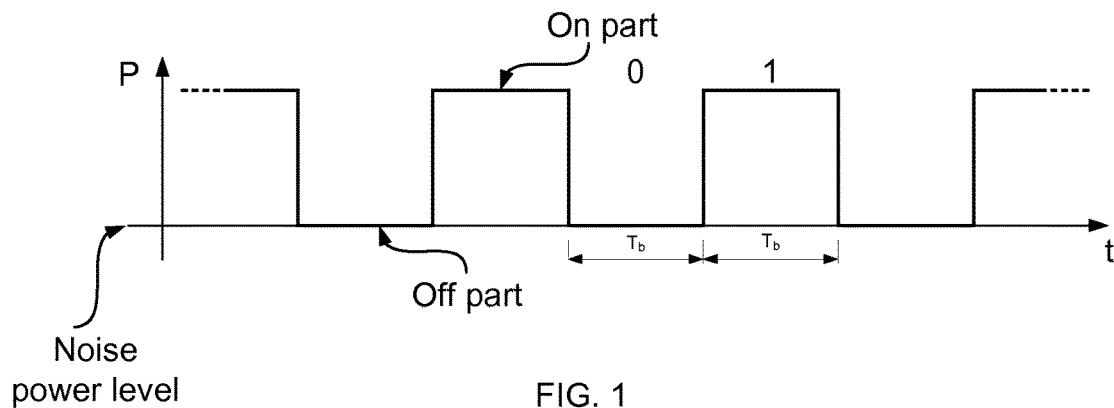
FIG. 1 schematically illustrates an on-off keying signal.
Figure 2:
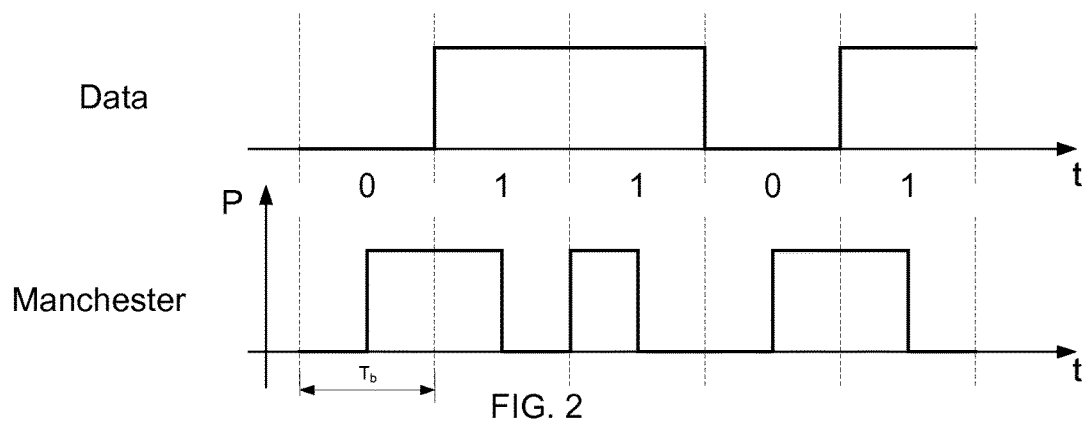
FIG. 2 illustrates a data bit with value representation.
Figure 3:
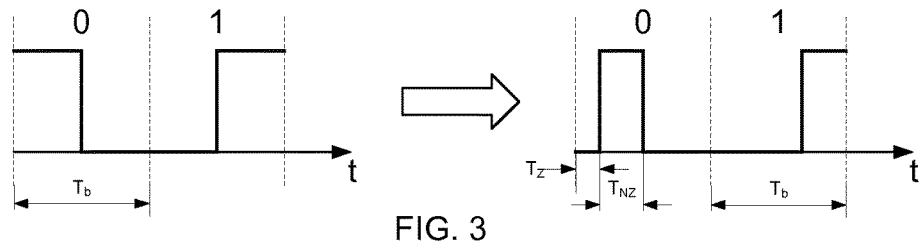
FIG. 3 schematically illustrates a modified value representation.
Figure 4:
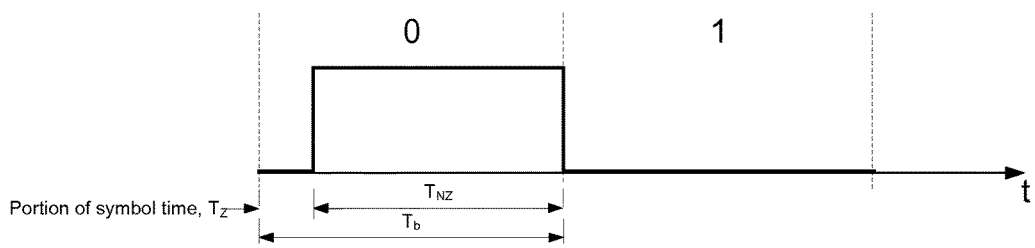
FIG. 4 illustrates a signal with modified OOK by zero-padding of a portion $T_Z$ of the symbol time $T_b$.
Figure 5:
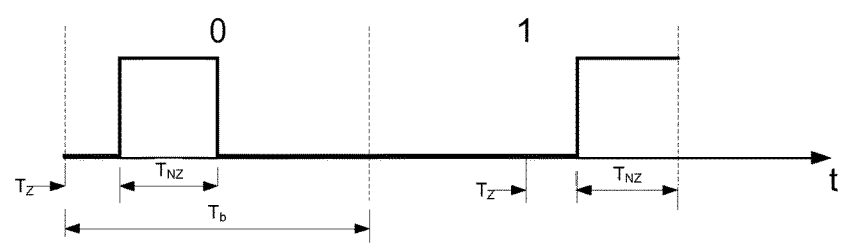

Thus, with an aim of selecting $T_{NZ}$ as large as possible without exceeding a certain average output power or of selecting $T_{NZ}$ as small as possible keeping the average power maximized by increasing the peak power, a distinguishable decodable signal should reasonably be provided. For example, consider a bit time $T_b$ of 8 µs, average power $P_{Avg}$ of 16 dBm, peak power $P_{peak}$ of 25 dBm, $P_{OFF}$ is zero, i.e. no transmission, and probabilities of logical ones and zeroes are equal. The ratio between peak power and average power $P_{peak}/P_{Avg}$ is 8, i.e. corresponding to about 9 dB. For a modified OOK, e.g. as illustrated in FIG. 4, and with equal probability of a one and a zero being transmitted, the average power limitation of 16 dBm will be fulfilled if $T_{NZ}$ is 2 µs, i.e. ¼ of $T_b$. i.e. in average the high-power signal is transmitted 2/16 of the time (observing a one and a zero; 2 µs of high-power signal and total time of 16 µs). Signal-to-noise gain of 6 dB can thus be achieved at the receiver end. A similar effect is achieved for modified Manchester coded OOK as illustrated in FIG. 5 for any bit value probability with $T_{NZ}$ of 1 µs for respective bit value representation, i.e. in average the high-power signal is transmitted ⅛ of the time (observing any of a one and a zero; 1 µs of high-power signal and total time of 8 µs).

The approach above may be used for lean or extremely lean transmissions, such as for wake-up signal to a wake-up radio in a receiver, where the wake-up radio has the purpose of receiving the wake-up signal and upon proper decoding thereof initiate operation of a main transceiver of the receiving entity, wherein the main transceiver commences traffic exchange with e.g. a network node. Here, the network node may be the entity comprising the transmitter discussed above. Features of receivers of such lean or extremely lean transmissions are often that they are low complexity and low power consuming. This normally leads to that they are specified for low bitrate communication. An example is that they are arranged to operate with a bitrate of $½^n$ of what is normally or in feasible operation modes used on a channel between the network node and the receiving entity, where n is for example 1, 2 or 3, at least for the extremely lean transmissions. That is, bit time $T_b$ may be relatively long. According to a traditional approach, signal energy is distributed along the bit time $T_b$, but as demonstrated above, signal-to-noise gain can be achieved by concentrating signal energy to a part of the bit time $T_b$. One approach of doing this is to provide a signal having a first power state, a second power state, and a third power state. The first power state is the above referred high-power state, or ON-state, which then has a higher signal power than the second and third power states. The second power state is assigned to a first part of the bit time $T_b$, where the power may be zero or close to zero irrespective of which bit value is conveyed during the bit time $T_b$. During a second part of the bit time $T_b$, either the first or the third power states are applied, i.e. in case of OOK, or a pattern of the first and third power states are applied, e.g. as the above demonstrated Manchester code, for representing the respective bit values. Typically, the power levels of the second and third power states are equal, but may differ for achieving certain effects that will be demonstrated below. Here, the first and second parts may be transmitted in either order, and the first part may even be divided into two portions with one portion transmitted before the second part and the rest transmitted after the second part. The term transmitted is here used also for the first part although that part may be silent. The first part constitutes at least half of the bit time $T_b$.

The second and the third power states have signal powers that are zero or close to zero. An advantage of having for example the second power state, and also the third power state, non-zero may for example be when being applied in a radio frequency spectrum where a listen-before-talk, LBT, approach is applied. That may facilitate for other entities to spot that the channel is occupied. Another advantage may be for the receiver to distinguish the signal or roughly determine synchronisation of the signal.

The non-zero approach may enable a receiver to distinguish all parts of a signal sequence from when no signal is provided. It is reasonable to assume that a receiver is able to detect a signal at the low-power state(s) which is 30 dB below the high-power state representing the equivalence to the ON state of OOK, or higher, e.g. somewhere between 20 dB and 30 dB below the high-power state. The ratio between the high-power state and the low-power state(s) is kept high such that the states are distinguishably decodable, preferably with a ratio corresponding to at least 20 dB.

On the other hand, the zero approach has the advantage of consuming less power and generating less interference, although the difference may be small to the small power intended for the second and/or third power states of the non-zero approach, but for an average power limitation as discussed above, also the contributions by the second and third power states need to be taken into account for the non-zero approach.

Figure 11:
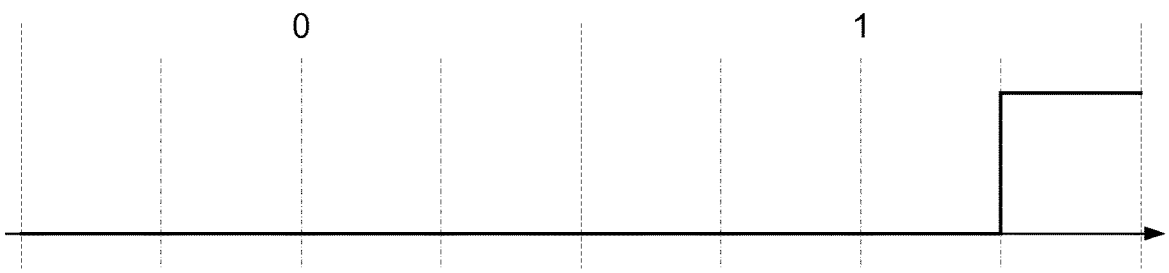
FIG. 11 illustrates a signal scheme for plain OOK.
Figure 12:
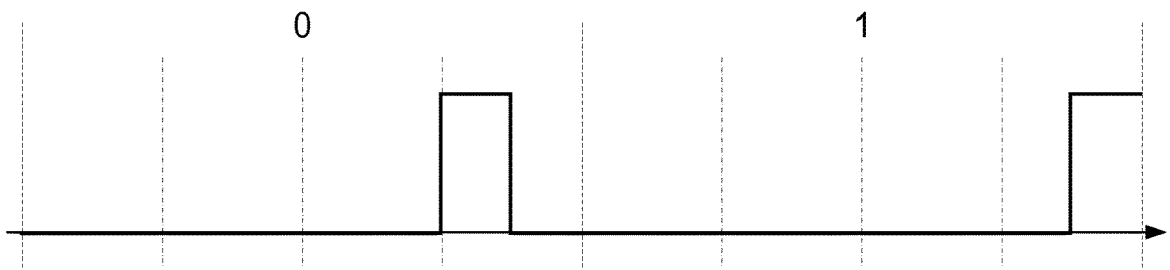
FIG. 12 illustrates a signal scheme Manchester coding.

With the above demonstrated features and options, a tangible example will be demonstrated with reference to FIGS. 11 and 12, which illustrate signal schemes for plain OOK and Manchester coding, respectively, according to the suggested approaches. Consider a system operating at for example 250 kbits/s and also has a low-rate mode where it operates for example a wake-up radio on 62.5 kbits/s. The bitrate when operating on 250 kbits/s is illustrated by dot-dash lines along the time line, while the bitrate when operating on 62.5 kbits/s is illustrated by dashed lines along the time line. Consider also that the numerical example demonstrated above applies in sense of relations between average power and peak power. The reason of mentioning the faster bitrate system in this example is that the skilled reader will recognize that existing mechanisms such as timing, sampling, etc. may be reused when implementing the suggested embodiment, wherein for the selection of durations of the first and second parts, this short-cut to implementation by reusing such mechanisms may be taken into account. Thus, as indicated in the numerical example above, the OOK as illustrated in FIG. 11 is silent (or close to zero when applying the non-zero approach demonstrated above) the whole bit time when transmitting one of the binary values, e.g. "0" as illustrated in FIG. 11, and when transmitting the other of the binary values, e.g. "1" as illustrated in FIG. 11, the signal is silent (or close to zero) the first ¾ of the bit time and then the high-power state is applied for the last ¼ of the bit time. A similar approach is provided for the Manchester coding approach in FIG. 12, but where the last ¼ of the bit time is used for providing the pattern for respective binary value of the symbol. It should be noted that the last ¼ of the bit time is here used for easier understanding of a tangible example, but the part having the high-power state or the indicative pattern may of course be present anywhere during the bit pattern that is determined for the system, and thus known by both the transmitter and the receiver. However, with a handy implementation in mind for the example above, it may be chosen taking the timings of the higher bitrate system into account, and for example put the high-power state in the first ¼ of the bit time in FIG. 11 and the pattern in the first ¼ of the bit time in FIG. 8. Furthermore, if the relation between average power limitation and peak power are not sufficient to provide the signal energy within ¼ of the bit time, the division between the always silent (or close to zero) part and the other part may be changed to ½ to ½. Similar, if the peak power is sufficient, the division may be selected to be ⅞ to ⅛. The short second part will as discussed above provide a signal-to-noise gain. Here, although the peak power is sufficient for a very short second part, the second part is reasonably not made too short since synchronisation and sampling issues at a receiver may degrade the improved performance by the herein demonstrated achievements. Considering reasonable implementations, the second part preferably should comprise $½^n$ of the duration of the bit, where n is any of 1, 2 or 3.

A further consideration is that when the above demonstrated approaches are used in a radio frequency spectrum where LBT is to be applied, the long silent (or close to zero) parts may impose problems for other entities to spot that the channel is occupied. This may be solved by for example dividing the second part into portions, e.g. two portions, which are distributed over the bit time. The time $T_{NZ}$ and thus the energy is thus distributed such that a remote entity is more likely to spot that the channel is occupied.

Thus, as discussed for the practical allocation of the second part, which may be static or dynamic following certain rules set up for the system such that the transmitter and receiver agrees, there may be a mapping of the second part, and thus indirectly the first part, to the bit time.

Figure 13:
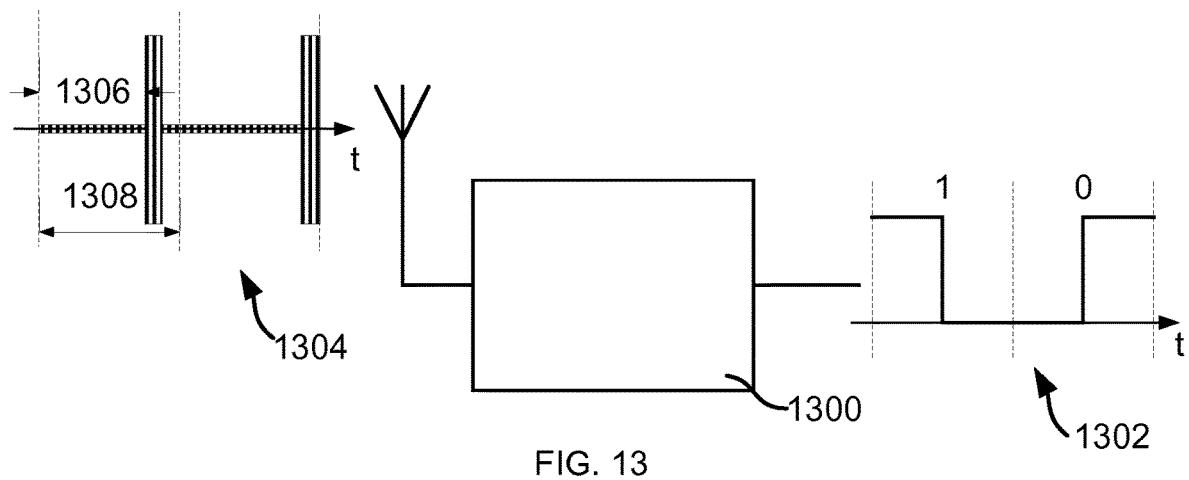
FIG. 13 schematically illustrates a receiver according to an embodiment.

Returning to the receiver, FIG. 13 schematically illustrates a receiver 1300 which is arranged to receive binary information which uses the binary amplitude shift keying demonstrated above with reference to the different embodiments. Information symbols 1302 are represented by a received signal 1304 including the power states demonstrated above. The receiver 1300 is thus arranged to receive the signal 1304 where the first power state has a higher signal power than the second power state, and the second power state is used during all of a first part 1306 of a bit time 1308, where the first part 1306 is the zero-padded as referred to above.

Figure 14:
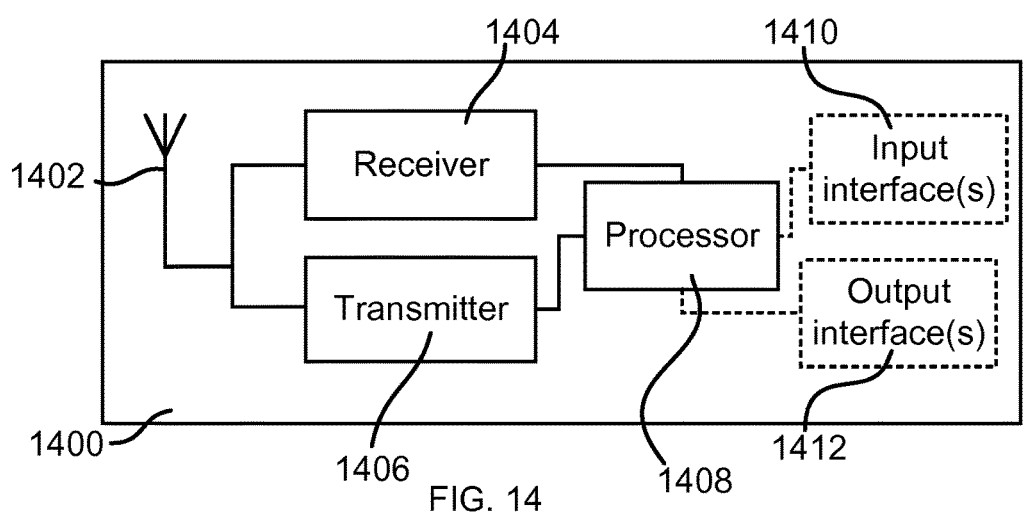
FIG. 14 is a block diagram schematically illustrating a communication device according to an embodiment.

FIG. 14 is a block diagram schematically illustrating a communication device 1400 according to an embodiment. The communication device comprises an antenna arrangement 1402, a receiver 1404 connected to the antenna arrangement 1402, a transmitter 1406 connected to the antenna arrangement 1402, a processing element 1408 which may comprise one or more circuits, one or more input interfaces 1410 and one or more output interfaces 1412. The interfaces 1410, 1412 can be operator interfaces and/or signal interfaces, e.g. electrical or optical. The communication device 1400 may be arranged to operate in a cellular communication network. In particular, by the processing element 1408 being arranged to perform the embodiments demonstrated with reference to FIGS. 1 to 9 and 15, the communication device 1400 is capable of transmitting a signal as demonstrated above. The receiver 1404 is here to be regarded as either a single receiver used for both the signal demonstrated above, e.g. wake-up signal, paging signal, control signal, etc., and for other traffic, e.g. associated with a cellular or wireless local area network, or as a receiver arrangement comprising one receiver arranged for traffic associated with e.g. a cellular or wireless local area network, and another receiver arranged and dedicated to receive the signal demonstrated above. The processing element 1408 can also fulfil a multitude of tasks, ranging from signal processing to enable reception and transmission since it is connected to the receiver 1404 and transmitter 1406, executing applications, controlling the interfaces 1410, 1412, etc.

Figure 15:
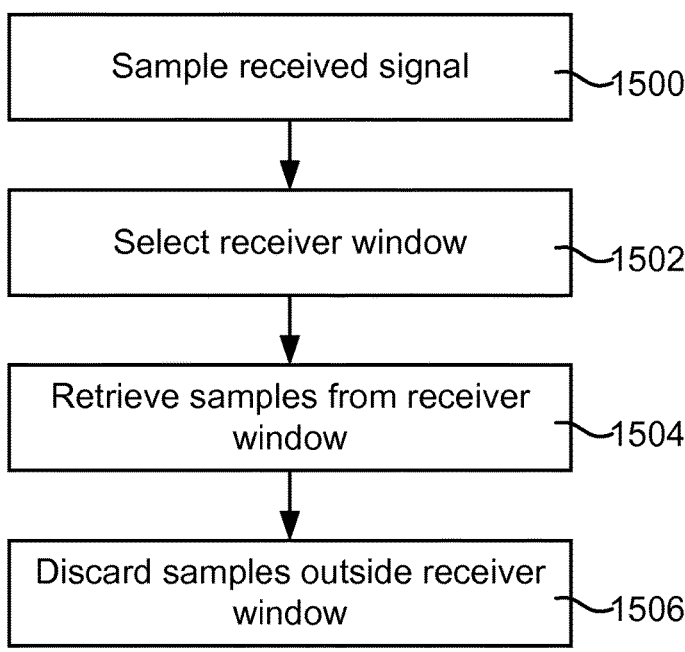
FIG. 15 is a flow chart schematically illustrating methods according to embodiments.

FIG. 15 is a flow chart schematically illustrating methods according to embodiments. The method is performed by a receiver, e.g. any of the receivers 1300, 1404 demonstrated with reference to FIGS. 13 and 14, respectively, to receive binary information which uses binary amplitude shift keying where information symbols are represented by a signal including a first power state and a second power state. The first power state has a higher signal power than the second power state. A duration of a bit includes a first part where the second power state is applied irrespective of which binary value being represented, and a second part where a binary value is represented by any of the first power and a third power state or a combination pattern of the first power state and the third power state. The first power state has a higher signal power than the third power state. Furthermore, the signal may apply any of the options demonstrated above and imply any of the issues demonstrated above.

The method comprises sampling 1500 a received signal having the propertied as of above. A receiver window is selected 1502, wherein samples from the receiver window are retrieved 1504 and samples outside the receiver window are discarded 1506. The selection 1502 may include selecting a duration of the retrieving 1502 of samples, i.e. the receiver window, is selected such that it is a time corresponding to the duration of the second part $T_{NZ}$ plus a time based on an expected synchronisation error $T_e$. According to one example, the receiver window may be selected to be based on the synchronisation error such that is becomes $T_{NZ}+2 \cdot T_e$, i.e. symmetric widening of the receiver window, or be based on the synchronization error such that it becomes $T_{NZ}+T_e$ with asymmetric widening, e.g. if it is known that only timing delays of the received signal are an issue. The expected synchronisation error may for example be based on a previous transmission and/or on when a last successful synchronisation was made, i.e. the longer time that has elapsed from a successful synchronisation, the larger expected synchronisation error. The synchronisation error may also be based on a type of clock signal that has been used lately in the receiver, i.e. if an accurate (and reasonably energy consuming) clock has been used, the expected synchronisation error is chosen to be smaller than if a less accurate (and less energy consuming) clock has been used. Other aspects, such as channel conditions may also be part of the consideration when assigning the receiver window.

For example, if it is determined that noise level is very low, the receiver window may be widened without much loss. On the other hand, if it is determined that harsh conditions, including reflection paths of the signal, the synchronisation error may be expected to be large, i.e. a delayed reflection may be the strongest signal. Thus, the expected synchronisation error may be derived by more or less complex considerations, and the assignment of the receiver window based on the expected synchronisation error may be made on more or less complex information and assumptions about how the synchronisation error will affect the reception of the transmission. Considering a least complex approach, the expected synchronisation error $T_e$ is predetermined, e.g. from knowledge at design of the communication system, and the assignment of the receiver window is fixed to $T_{NZ}+2 \cdot T_e$ with symmetric widening of the receiver window.

Figure 16:
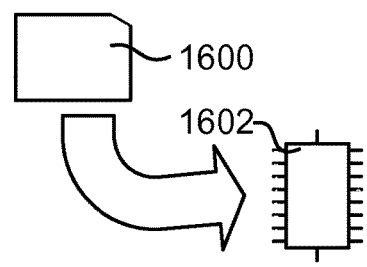
FIG. 16 schematically illustrates a computer-readable medium and a processing device.

The methods according to the present disclosure are suitable for implementation with aid of processing means, such as computers and/or processors, especially for the case where the processing element 1408 demonstrated above comprises a processor handling the selection of duration of the second part and the selection of signal power for the first power state, and possibly for the mapping of the second part. Therefore, there is provided computer programs, comprising instructions arranged to cause the processing means, processor, or computer to perform the steps of any of the methods according to any of the embodiments described with reference to FIGS. 1 to 9 and 15. The computer programs preferably comprise program code which is stored on a computer readable medium 1600, as illustrated in FIG. 16, which can be loaded and executed by a processing means, processor, or computer 1602 to cause it to perform the methods, respectively, according to embodiments of the present disclosure, preferably as any of the embodiments described with reference to FIGS. 1 to 9 and 15. The computer 1602 and computer program product 1600 can be arranged to execute the program code sequentially where actions of the any of the methods are performed stepwise, or be made to perform the actions on a real-time basis. The processing means, processor, or computer 1602 is preferably what normally is referred to as an embedded system. Thus, the depicted computer readable medium 1600 and computer 1602 in FIG. 16 should be construed to be for illustrative purposes only to provide understanding of the principle, and not to be construed as any direct illustration of the elements.

The invention claimed is:

1. A receiver configured to receive binary information from a transmission using a binary amplitude shift keying where information symbols are represented by a signal including a first power state and a second power state, the first power state having a higher signal power than the second power state, a duration of a bit includes a first part where the second power state is applied irrespective of which binary value is represented, and a second part where a binary value is represented by one of the first power, a third power state and a combination pattern of the first power state and the third power state, the first power state having a higher signal power than the third power state, the receiver comprising:
 a sampling circuit configured to retrieve samples of the received signal during the second part and discard samples during the first part, a duration of the retrieving of samples being selected such that the duration of the retrieving of samples is a time corresponding to the duration of the second part plus a time based on an expected synchronization error; and the receiver being configured to have an indication on channel conditions and the duration of the sampling being made shorter for worse channel conditions.

2. The receiver of claim 1, wherein the duration of the second part is variable to comprise $½^n$ of the duration of the bit, where n is one of 1, 2 and 3, wherein the sampling circuit is configured to have a higher sampling rate for shorter duration of the second part.

3. The receiver of claim 2, wherein the duration of the second part is derived from an allocated bit rate for the received transmission.

4. The receiver of claim 1, wherein the indication on channel conditions are derived by the receiver from a previous transmission.

5. The receiver of claim 1, wherein the duration of the second part is variable, and a ratio between the duration of the second part and the duration of the sampling is decreased when the duration of the second part is decreased.

6. The receiver of claim 1, wherein the expected synchronization error is predetermined.

7. The receiver of claim 1, wherein the expected synchronization error is estimated based on elapsed time since a previous transmission where synchronization could be established.

8. The receiver of claim 1, wherein the receiver is part of a communication apparatus.

9. The receiver of claim 8, wherein the receiver is configured to operate as a wake-up receiver to control on and off states of a main transceiver of the communication apparatus based on the signal received by the receiver.

10. A method performed by a receiver configured to receive binary information from a transmission using a binary amplitude shift keying where information symbols are represented by a signal including a first power state and a second power state, the first power state having a higher signal power than the second power state, a duration of a bit includes a first part where the second power state is applied irrespective of which binary value is represented, and a second part where a binary value is represented by one of the first power, a third power state and a combination pattern of the first power state and the third power state, the first power state having a higher signal power than the third power state, the method comprising:
    retrieving samples of the received signal during the second part;
    discarding samples during the first part;
    selecting a duration of the retrieving of samples such that the duration of the retrieving of samples is a time corresponding to the duration of the second part plus a time based on an expected synchronization error;
    acquiring an indication on channel conditions; and
    selecting the duration of the sampling to be shorter for worse channel conditions.

11. The method of claim 10, wherein the duration of the second part is variable to comprise $½^n$ of the duration of the bit, where n is one of 1, 2 and 3.

12. The method of claim 11, further comprising selecting a higher sampling rate for shorter duration of the second part.

13. The method of claim 11, further comprising deriving the duration of the second part from an allocated bit rate for the received transmission.

14. The method of claim 10, wherein the acquiring of the indication on channel conditions comprises estimating channel conditions of a previous transmission.

15. The method of claim 10, wherein the duration of the second part is variable, and the method further comprises decreasing a ratio between the duration of the second part and the duration of the sampling when the duration of the second part is decreased.

16. The method of claim 10, wherein the expected synchronization error is predetermined.

17. The method of claim 10, further comprising estimating the expected synchronization error based on elapsed time since a previous transmission where synchronization could be established.

18. A non-transitory computer storage medium storing a computer program comprising instructions which, when executed on a processor of a receiver, the receiver configured to receive binary information from a transmission using a binary amplitude shift keying where information symbols are represented by a signal including a first power state and a second power state, the first power state having a higher signal power than the second power state, a duration of a bit includes a first part where the second power state is applied irrespective of which binary value is represented, and a second part where a binary value is represented by one of the first power, a third power state and a combination pattern of the first power state and the third power state, the first power state having a higher signal power than the third power state, causes the receiver to perform a method comprising:
    retrieving samples of the received signal during the second part;
    discarding samples during the first part;
    selecting a duration of the retrieving of samples such that the duration of the retrieving of samples is a time corresponding to the duration of the second part plus a time based on an expected synchronization error;
    acquiring an indication on channel conditions; and
    selecting the duration of the sampling to be shorter for worse channel conditions.

* * * * *